United States Patent [19]

Lang et al.

[11] Patent Number: 5,133,440
[45] Date of Patent: Jul. 28, 1992

[54] ROTARY STOP MECHANISM WITH TRACK ACTUATION OF A STOP PIN

[75] Inventors: David J. Lang; David L. Jacques, both of Rockford, Ill.

[73] Assignee: Sundstrand Corporation, Rockford, Ill.

[21] Appl. No.: 518,408

[22] Filed: May 2, 1990

[51] Int. Cl.⁵ .................. F16D 71/00; F16D 65/14
[52] U.S. Cl. .................................................. 192/139
[58] Field of Search ............... 192/139, 7, 148; 74/10.2, 816, 57

[56] References Cited

U.S. PATENT DOCUMENTS

| | | | |
|---|---|---|---|
| 1,261,111 | 4/1918 | Fasey et al. | 74/57 |
| 2,356,167 | 8/1944 | McKelvey | 192/139 X |
| 2,728,264 | 12/1955 | Debrie | 74/57 X |
| 3,190,628 | 6/1965 | Litzka | 74/57 X |
| 4,641,737 | 2/1987 | Gillingham et al. | 192/139 X |
| 4,930,611 | 6/1990 | Grimm | 192/139 |
| 4,932,511 | 6/1990 | Ames | 192/139 |

FOREIGN PATENT DOCUMENTS 1544583  4/1979  United Kingdom .

Primary Examiner—Rodney H. Bonck
Attorney, Agent, or Firm—Antonelli, Terry, Stout & Kraus

[57] ABSTRACT

A rotary stop mechanism (10) in accordance with the invention stops rotation of a shaft (12) at a fixed angular position in response to relative rotation of first and second gears (14, 16) on the shaft through a fixed angle which causes a stop pin (26) to project axially from one of the gears to engage a stop (32) when the relative angular rotation occurs by utilizing a control track (34) having a section (48) varying in axial position with respect to the axis of rotation to cause the stop pin to project axially to a position at which the stop pin hits the stop when the gear carrying the stop pin rotates to a fixed angular position.

26 Claims, 2 Drawing Sheets

ROTARY STOP MECHANISM WITH TRACK ACTUATION OF A STOP PIN

TECHNICAL FIELD

The present invention relates to rotary stop mechanisms used for stopping the rotation of a shaft when a predetermined degree of relative rotation occurs between first and second gears mounted on the shaft. More particularly, the present invention relates to rotary stop mechanisms used in airframe applications such as wing folding mechanisms.

BACKGROUND ART

U.S. patent application Ser. No. 360,509, filed on Jun. 2, 1989 and now U.S. Pat. No. 4,932,511, which is assigned to the assignee of the present invention discloses a rotary travel limit stop apparatus for limiting the rotation of a shaft when a predetermined degree of rotation occurs between first and second gears mounted on the shaft. The stopping of rotation is produced by an axially movable stop member which is carried by one of the gears which is displaced into an axial position which engages a fixed stop by rotation of the second gear relative to the first gear. The stop member is carried by a housing which contains the shaft and gears. An annular groove with a variable depth is contained within the second gear which does not carry the stop member. The stop member rides within the annular groove. A compressed spring biases the stop member away from an extended position, which will engage the stop when a predetermined degree of relative rotation occurs between the first and second gears, to a retracted position. When a predetermined degree of angular rotation occurs between the gears which is caused by another gear driving the first and second gears which respectively have a different number of teeth, the stop member is pushed toward the stop by a decrease in depth of the channel as a consequence of the decreased depth of the channel engaging an end of the stop member. The spring is compressed as the stop member is forced outward by the decrease in the depth of the groove.

While the foregoing rotary travel limit stop apparatus is useful in producing stopping of rotation of a shaft when a predetermined degree of relative rotation occurs between gears mounted on the shaft, the spring used for holding the stop member in a retracted position which will not engage the stop member is disadvantageous for certain applications. For example, when the rotary travel limit stop apparatus is utilized in an application for controlling the folding of wingtips into a vertically upward position in aircraft carried by an aircraft carrier, the spring could be subject to breakage. The stop member is not attached to the annular control surface. Breakage of the spring would remove the biasing of the spring in a retracted position which could result in contacting of the stop pin with the stop in an angular position of the shaft which is not desired to prevent stopping in the desired position of the shaft. Furthermore, the annular groove did not provide as high a degree of axial position control as was desired. Buildup in the annular groove, such as hardened grease or grit, could result in inadvertent actuation of the stop mechanism. The support surface in the bore of the gear for the stop pin was shortened as a result of placement of the spring around the stop pin which could result in high stress on both the stop pin and the gear at the surface area where the pin engages the bore.

DISCLOSURE OF INVENTION

The present invention is a rotary stop mechanism which stops rotation of a shaft at a fixed angular position in response to relative rotation of first and second gears on the shaft through a fixed angular rotation which causes a stop pin to project axially from one of the gears to engage a stop when the fixed angular rotation occurs that utilizes a control track retaining the stop pin against axially movement. The retention of the stop pin by the control track eliminates the potential problem of the prior art wherein failure of the spring bias could result in the stop pin being axially displaced to stop the shaft at an undesired angular position. As a result, control of the positioning of the shaft including its stoppage is insured at all times. Furthermore, the control track is not subject to buildup resulting in inadvertent deployment. Finally, the entire thickness of the bore of the gear supporting the stop is utilized which lessens stress.

In a rotary stop mechanism which stops rotation of a shaft at a fixed angular position in response to relative rotation of first and second gears on the shaft through a fixed angle which causes a stop pin to project axially from one of the gears to engage a stop when the fixed angular rotation occurs, an improvement in accordance with the invention includes a control track which retains the stop pin against axially movement having a control section varying in axially position with respect to an axis of rotation of the shaft to cause the stop pin to project axially to a position at which the stop pin hits the stop when the gear carrying the stop pin rotates to a fixed angular position. The track further comprises a first additional section extending from a first end of the track in which the track does not vary in axial position which is joined to the control section of the track and a second additional section joined to the control section in which the track does not vary in axial position with the second section containing a second end of the track at which the stop pin engages the stop. The track comprises a channel within a periphery of a cylindrical surface which rotates with one of the gears and the stop pin has a channel engaging pin which projects from the stop pin into the channel so that axial position of the pin is controlled by opposed surfaces of the channel engaging diametrically opposed surfaces of the channel engaging pin. The cylindrical surface is part of one of the gears. The invention further comprises an arcuate slot extending through the one gear from a first side to a second side and extending from a first to a second angular position of the track with the stop pin projecting from the first side to the second side and the cylindrical surface being disposed on the second side of the one gear. The track is located at a fixed radial position.

A rotary stop mechanism in accordance with the present invention includes a first gear mounted on a shaft having a plurality of teeth; a second gear mounted on the shaft having a plurality of teeth with the second gear being mounted at a position axially displaced from the first gear; a third gear driving the first and second gears which meshes with the first and second gears to produce relative motion between the gears when the third gear rotates; a stop pin mounted in a bore of the first gear at a position offset from an axis of rotation of the shaft which is movable axially between a first position which extends outward from the bore engaging a stop at a predetermined rotational position of the first gear and a second position not engaging the stop; and a cylindrical surface which rotates with the second gear having a control track extending from a first end disposed at a first axial and radial position of the cylindrical surface to a second end disposed at a second axial and angular position of the cylindrical surface which retains the stop pin to cause the stop pin to move between the first and second positions when the track rotates. The track is a channel within a periphery of the cylindrical surface; and the stop pin has a channel engaging pin which projects from the stop pin into the channel so that axial position of the stop pin is controlled by opposed surfaces of the channel engaging diametrically opposed surfaces of the channel engaging pin. The periphery of the cylindrical surface is an outer periphery. The track has a first section extending from the first end of the track in which the track does not vary in axial position and a second control section joined to the first section in which the track varies in axial position with the second section controlling movement of the stop pin between the first and second positions. The track further comprises a third section joined to the second section in which the track does not vary in axial position with the third section containing the second end of the track. The cylindrical surface is part of the second gear and further comprises an arcuate slot extending through the second gear from the first side to a second side and extending from the first to the second angular position of the track with the stop pin projecting from the first side to the second side and the cylindrical surface being disposed on the second side of the second gear. The slot has a radius which is different than a radius of the cylindrical surface and the stop pin has semicylindrical surface having a surface from which the channel engaging pin projects toward the channel. The radius of the slot engages a surface opposed to the surface from which the channel engaging pin projects to bias the channel engaging pin into the slot. The radius of the slot is larger than a radius of the cylindrical surface and the channel engaging pin projects toward the channel. The track further comprises a fourth section joined to the third section which extends axially through the arcuate slot and a fifth section joined to the first section in which the track varies in axial position to cause the stop pin to move between the first and second positions.

BEST MODE FOR CARRYING OUT THE INVENTION

Figure 1:
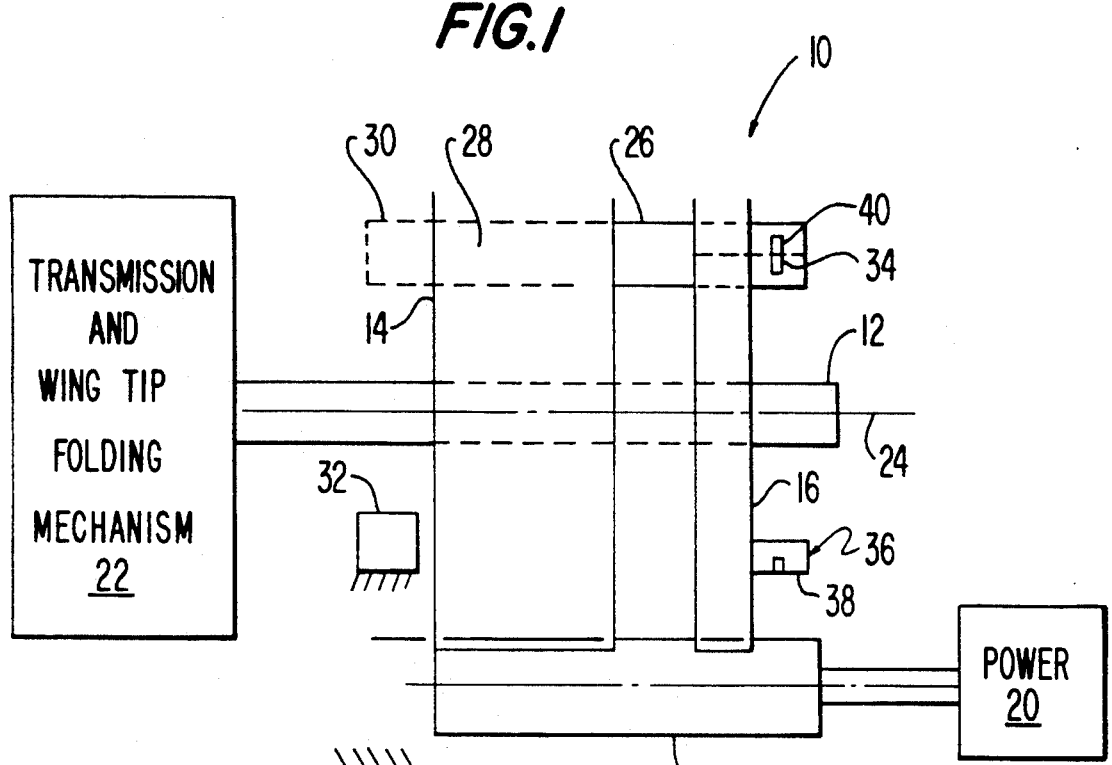
FIG. 1 illustrates a schematic diagram of a rotary stop mechanism in accordance with the present invention.

FIG. 1 illustrates a schematic diagram of a rotary stop mechanism 10 in accordance with the present invention. A preferred application of the rotary stop mechanism is for limiting the folding of wingtips into a vertically upward position of aircraft which are deployed on an aircraft carrier. The rotary stop mechanism 10 functions to stop rotation of a shaft 12 at a fixed angular position in response to relative rotation of first and second gears 14 and 16 which may rotate relative to each other on the shaft 12. As illustrated, the gear 14 is attached to the shaft 12 and the gear 16 rotates relative to the shaft. A third gear 18 meshes with the first and second gears 14 and 16. The gear 18 is driven by a suitable power source 20 which supplies driving torque to the gear 14 which drives the shaft 12 to supply torque to a transmission and wingtip folding mechanism 22 which may be of conventional construction. The transmission and wingtip folding mechanism may consist of a planetary gear transmission which drives a wingtip folding mechanism to fold the wingtips of an airplane which is to be deployed on an aircraft carrier into a vertically upward position to facilitate storage. The gears 14 and 16 have different numbers of teeth (different pitch) which results in their rotation about the axis of rotation 24 of the shaft 12 at different rates of rotation. The gear 14 carries a stop pin 26 within a bore 28 which is offset radially from the axis of rotation 24 of the shaft 12. The stop pin 26 is axially movable between a first position at which the stop pin extends outward from the bore 28 as illustrated by the dotted line extension 30 at which the extension will engage a stop 32 which may be part of a housing for stopping rotation of the shaft 12 and a second axial position at which the stop pin will not engage the stop 32 which preferably is totally within the bore. The pin 26 is supported by the total length of the bore which lessens stress caused by contract with the stop 32 when compared with the prior art.

The position of the stop pin 26 in moving between the first position and the second position is controlled by a control track 34 which is machined within a cylindrical section 36. Preferably, although the invention is not limited thereto, the control track 34 is machined within the outer periphery 38 of the cylindrical section 36. The control track 34 contains a control section having an axial pitch which causes a channel engaging pin 40 which is joined to the stop pin 26 and retained within the track to translate the stop pin axially between the first and second positions. Optionally, as illustrated in phantom in FIG. 2, another section located at another end of the track may be provided with an axial pitch to translate the stop pin 26 between the first and second positions so as to cause the stop 32 to be contacted to provide another stopped position.

Figure 2:
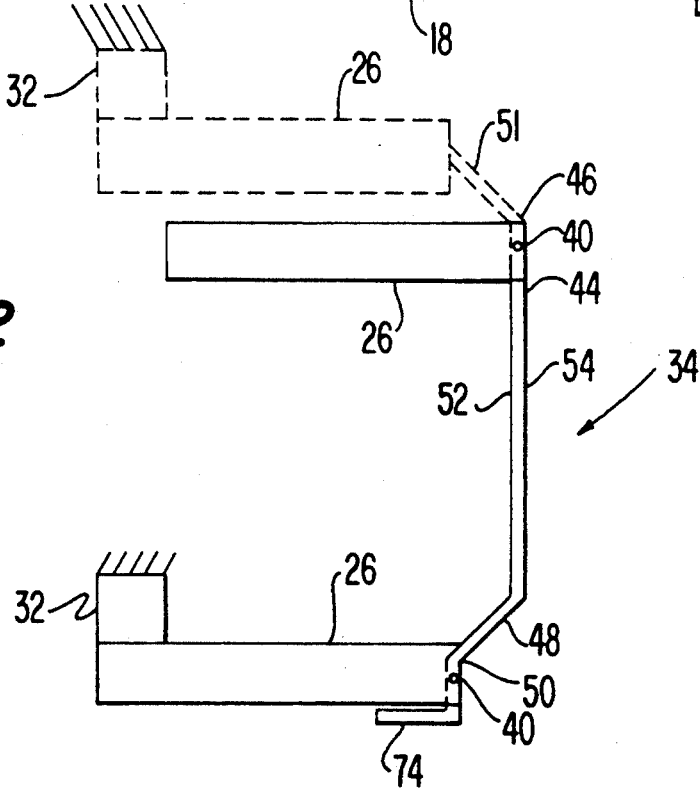
FIG. 2 illustrates a schematic diagram of the function of the control track in positioning the stop pin in accordance with the present invention.

FIG. 2 illustrates a schematic diagram of the control track 34 which is machined in the outer periphery 38 through approximately 270° although the number of degrees which are subtended by the control track is a matter of design. The track 34, which is a channel machined within the cylindrical section 36, has a first section 44 extending from a first end 46 in which the track does not vary in axial position and a second control section 48 joined to the first section in which the track varies in axial position. The second section controls movement of the stop pin between the first and second positions as described above with respect to FIG. 1. The track 34 further contains a third section 50 in which the track does not vary in axial position with the third section containing a second end of the track at which the stop pin extension 30 engages the grounding mechanism 32 as illustrated in the bottom portion of FIG. 2. The track 34 further may optionally have another section 51 illustrated in phantom varying in axial position between the first and second positions to position the stop pin 26 to contact the stop 32 as illustrated in phantom. The optional section 51 is provided when it is desired to provide a stop position for the shaft 12 at both ends of the track 34. The channel engaging pin 40 projects from the stop pin into the channel of the track 34 where the channel engaging pin 40 is retained. The axial position of the stop pin is controlled by opposed surfaces 52 and 54 of the channel 34 engaging diametrically opposed surfaces of the channel engaging pin which respectively contact the surfaces 52 and 54.

Figure 3:
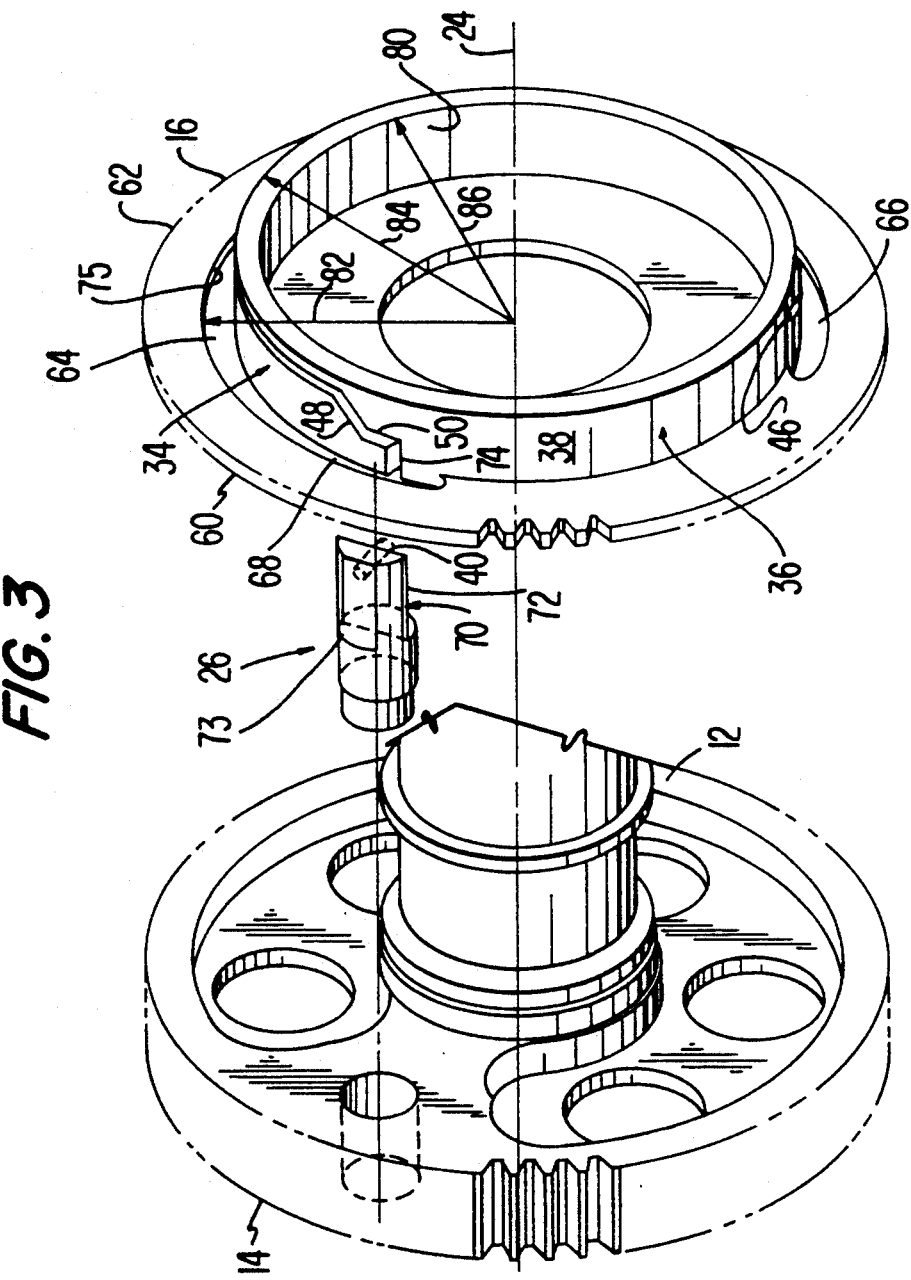
FIG. 3 illustrates a partial exploded view of an embodiment of the present invention.

FIG. 3 illustrates a partial exploded view of an embodiment of the first and second gears 14 and 16, control pin 26 and track 34 of the present invention. Like reference numerals identify like parts in FIGS. 1-3. The third gear 18 power drive 20, transmission and wingtip folding mechanism 22 and stop 32 have been omitted for purposes of clarity. The stop pin 26 extends from a first side 60 of the gear 16 to a second side 62 through an arcuate slot 64 extending through the second gear. The arcuate slot 64 extends at least from a first angular position corresponding to the first end of the track 46 to at least a second angular position 68 which corresponds to the second end 50 of the track 34. The track 34 and arcuate slot 64 subtend an angle of approximately 270° although the invention is not limited thereof. The stop pin 26 has a semicircular section 70 which extends through the arcuate slot 64. The channel engaging pin 40 projects from surface 72 of the semicircular section 70 into the channel defining the track 34 where the channel engaging pin 40 is retained to provide positive engagement. Flat surface 73 is opposed to surface 72 and engages the cylindrical surface 75 defined by slot 68 to bias the channel engaging pin 40 within the channel 38. Unlike the prior art in which failure of the spring could result in loss of control of the axial position of the stop member, the axial position of the stop member 26 is always controlled while the channel engaging pin 40 translates from the first end 46 to the second end 50 of the track. Gear 16 does not transmit substantial torque as a result of its only function being to control translation of the stop pin 26 between the first and second positions which requires overcoming the frictional forces associated with translating the stop pin between the first and second positions. Section 74 of the track 34 is provided for assembly purposes. Placement of the track 34 within the cylindrical section 36 on the second side 62 of the second gear 16 reduces the axial dimension of the assembly containing the first and second gears 14 and 16. The point of contact of the stop pin 26 with the stop (not illustrated) corresponds to approximately the midpoint of the third section 50 of the track 34. As a consequence of the third section 50 not having any axial slope, loading of the pin (40) from the impact of the stop pin 26 on the stop 32 is avoided. Furthermore, by having the shaft 12 stopped by the impact of the stop pin 26 on the stop 32 (not illustrated) at approximately the midpoint of the third section 50 prevents the uncontrolled axial movement of the stop pin in the fourth section 74 which is provided for assembly purposes.

While in the preferred form of the invention the track 34 is contained in the outer peripheral surface 38 of the cylindrical section 36, it should be understood that the invention may be practiced with the control track contained within the inner peripheral surface 80. In that situation, the orientation of the semicylindrical section 50 would be rotated 180° so that the channel engaging pin projects radial outward from the surface 72. Furthermore, while as illustrated the slot 64 has at least one radius 82 which is larger than a radius 84 of the cylindrical surface 38, it should be understood that in the alternative implementation discussed above, the slot 64 would have at least one radius less than the radius 86 of the inner peripheral surface 80 and the surface 73 would engage a cylindrical surface defined by a radius of the slot less than the radius 86.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A rotary stop mechanism comprising:
   a first gear mounted on a shaft having a plurality of peripherally mounted teeth;
   a second gear mounted on the shaft having a plurality of peripherally mounted teeth with the second gear being mounted at a position axially displaced from the first gear;
   a third gear driving the first and second gears which meshes with the first and second gears to produce relative motion between the gears when the third gear rotates;
   a stop pin mounted in a bore of the first gear at a position offset from an axis of rotation of the shaft which is movable axially between a first position which extends outward from the bore engaging a stop at a predetermined rotational position of the first gear and a second position not engaging the stop; and
   a cylindrical surface which rotates with the second gear having a control track extending from a first end disposed at a first axial and angular position of the cylindrical surface to a second end disposed at a second axial and angular position of the cylindrical surface which retains the stop pin to cause the stop pin to move between the first and second positions when the track rotates.

2. A rotary stop in accordance with claim 1 wherein:
   the track is a channel within a periphery of the cylindrical section; and
   the stop pin has a channel engaging pin which projects from the stop pin and is retained in the channel so that axial position of the stop pin is controlled by opposed surfaces of the channel engaging diametrically opposed surfaces of the channel engaging pin.

3. A rotary stop in accordance with claim 2 wherein:
   the periphery is an outer periphery.

4. A rotary stop in accordance with claim 1 wherein:
   the track has a first section extending from the first end of the track in which the track does not vary in axial position and a second control section joined to the first section in which the track varies in axial position with the second section controlling movement of the stop pin between the first and second positions.

5. A rotary stop in accordance with claim 2 wherein:
   the track has a first section extending from the first end of the track in which the track does not vary in axial position and a second control section joined to the first section in which the track varies in axial position with the second section controlling movement of the stop pin between the first and second positions.

6. A rotary stop in accordance with claim 3 wherein:
   the track has a first section extending from the first end of the track in which the track does not vary in axial position and a second control section joined to the first section in which the track varies in axial position with the second section controlling movement of the stop pin between the first and second positions.

7. A rotary stop in accordance with claim 4 wherein the track further comprises:
a third section joined to the second section in which the track does not vary in axial position with the third section containing the second end of the track.

8. A rotary stop in accordance with claim 5 wherein the track further comprises:
a third section joined to the second section in which the track does not vary in axial position with the third section containing the second end of the track.

9. A rotary stop in accordance with claim 6 wherein the track further comprises:
a third section joined to the second section in which the track does not vary in axial position with the third section containing the second end of the track.

10. A rotary stop in accordance with claim 7 wherein: the cylindrical surface is part of the second gear; and further comprising
an arcuate slot extending through the second gear from a first side to a second side and extending from the first to the second angular position of the track with the stop pin projecting from the first side to the second side and the cylindrical surface being disposed on the second side of the second gear.

11. A rotary stop in accordance with claim 8 wherein: the cylindrical surface is part of the second gear; and further comprising
an arcuate slot extending through the second gear from a first side to a second side and extending from the first to the second angular position of the track with the stop pin projecting from the first side to the second side and the cylindrical surface being disposed on the second side of the second gear.

12. A rotary stop in accordance with claim 9 wherein: the cylindrical surface is part of the second gear; and further comprising
an arcuate slot extending through the second gear from a first side to a second side and extending from the first to the second angular position of the track with the stop pin projecting from the first side to the second side and the cylindrical surface being disposed on the second side of the second gear.

13. A rotary stop in accordance with claim 10 wherein:
the slot has a radius which is different than a radius of the cylindrical surface, the stop pin has a semicylindrical section having a surface from which the channel engaging pin projects toward the channel and a surface opposed to the surface from which the channel engaging pin projects to bias the channel engaging pin into the slot.

14. A rotary stop in accordance with claim 13 wherein:
the radius of the slot is larger than a radius of the cylindrical surface and the channel engaging pin projects toward the channel.

15. A rotary stop in accordance with claim 11 wherein:
the slot has a radius which is different than a radius of the cylindrical surface and the stop pin has a semicylindrical section having a surface from which the channel engaging pin projects toward the channel and a surface opposed to the surface from which the channel engaging pin projects to bias the channel engaging pin into the slot.

16. A rotary stop in accordance with claim 15 wherein:
the radius of the slot is larger than a radius of the cylindrical surface and the channel engaging pin projects toward the channel.

17. A rotary stop in accordance with claim 12 wherein:
the slot has a radius which is different than a radius of the cylindrical surface and the stop pin has a semicylindrical section having a surface from which the channel engaging pin projects toward the channel and a surface opposed to the surface from which the channel engaging pin projects to bias the channel engaging pin into the slot.

18. A rotary stop in accordance with claim 17 wherein:
the radius of the slot is larger than a radius of the cylindrical surface and the channel engaging pin projects toward the channel.

19. A rotary stop in accordance with claim 7 wherein the track further comprises:
a fourth section joined to the third section which extends axially through the arcuate slot and a fifth section joined to the first section in which the track varies in axial position to cause the stop pin to move between the first and second positions.

20. A rotary stop in accordance with claim 8 wherein the track further comprises:
a fourth section joined to the third section which extends axially through the arcuate slot and a fifth section joined to the first section in which the track varies in axial position to cause the stop pin to move between the first and second positions.

21. A rotary stop in accordance with claim 9 wherein the track further comprises:
a fourth section joined to the third section which extends axially through the arcuate slot and a fifth section joined to the first section in which the track varies in axial position to cause the stop pin to move between the first and second positions.

22. In a rotary stop mechanism which stops rotation of a shaft at a fixed angular position in response to relative rotation of first and second gears on the shaft through a fixed angle which causes a stop pin to project axially from one of the gears to engage a stop when the fixed angular rotation occurs, the improvement comprising:
a control track which retains the stop pin against axial movement out of the control track in first and second axial directions having a control section varying in axial position with respect to the axis of rotation to cause the stop pin to project axially to a position at which the stop pin hits the stop when the gear carrying the stop pin rotates to a fixed angular position.

23. A rotary stop mechanism in accordance with claim 22 wherein the track further comprises:
an additional section joined to the control section in which the track does not vary in axial position with the additional section containing a second end of the track at which the stop pin engages the stop.

24. A rotary stop mechanism in accordance with claim 23 wherein:

the track comprises a channel within a periphery of a cylindrical surface which rotates with one of the gears and the stop pin has a channel engaging pin which projects from the stop pin into the channel and is engaged by the channel so that axial position of the stop pin is controlled by opposed surfaces of the channel engaging diametrically opposed surfaces of the channel engaging pin.

25. A rotary stop mechanism in accordance with claim 24 wherein:

the cylindrical surface is part of one of the gears and further comprising an arcuate slot extending through the one gear from a first side to a second side and extending from a first to a second angular position of the track with the stop pin projecting from the first side to the second side and the cylindrical surface being disposed on the second side of the one gear.

26. A rotary stop mechanism in accordance with claim 22 wherein:

the track is located at a fixed radial position.

* * * * *